US012615162B2

(12) United States Patent
Kochar et al.

(10) Patent No.: US 12,615,162 B2
(45) Date of Patent: Apr. 28, 2026

(54) METHODS FOR ESTABLISHING A CONNECTION TO A SERVER WITH A CACHED CERTIFICATE AND DEVICES THEREOF

(71) Applicant: F5, Inc., Seattle, WA (US)

(72) Inventors: Neha Kochar, Seattle, WA (US); Liang Cheng, Seattle, WA (US); Saxon C. Amdahl, Seattle, WA (US)

(73) Assignee: F5, Inc., Seattle, WA (US)

( * ) Notice: Subject to any disclaimer, the term of this patent is extended or adjusted under 35 U.S.C. 154(b) by 238 days.

(21) Appl. No.: 18/146,134

(22) Filed: Dec. 23, 2022

(65) Prior Publication Data

US 2025/0300844 A1 Sep. 25, 2025

(51) Int. Cl.
*H04L 9/32* (2006.01)
*H04L 9/08* (2006.01)
(52) U.S. Cl.
CPC .......... *H04L 9/3268* (2013.01); *H04L 9/0861* (2013.01); *H04L 9/3297* (2013.01)
(58) Field of Classification Search
CPC ... H04L 9/3268; H04L 9/0861; H04L 9/3297; H04L 9/3263; H04L 63/062; H04L 63/166; H04L 67/568; H04L 63/0823
See application file for complete search history.

(56) References Cited

U.S. PATENT DOCUMENTS

| | | | | |
|---|---|---|---|---|
| 7,778,194 B1 * | 8/2010 | Yung | ....................... | H04L 47/10 |
| | | | | 709/224 |
| 8,707,028 B2 * | 4/2014 | Wicker | ............... | H04L 63/1466 |
| | | | | 726/10 |
| 8,966,267 B1 * | 2/2015 | Pahl | ...................... | H04L 9/3268 |
| | | | | 713/171 |
| 9,154,488 B2 * | 10/2015 | Innes | .................. | H04L 63/0884 |
| 9,306,839 B2 * | 4/2016 | Shanmugavadivel | .. | H04L 45/22 |
| 9,328,455 B2 * | 5/2016 | Yamamoto | .......... | D06M 15/277 |
| 9,742,806 B1 * | 8/2017 | Rothstein | ............ | H04L 63/0281 |

(Continued)

OTHER PUBLICATIONS

Van den Abeele et al.; "Secure Service Proxy: A CoAP(s) Intermediary for a Securer and Smarter Web of Things", 2017, MDPI, pp. 1-30. (Year: 2017).*

(Continued)

*Primary Examiner* — Matthew Smithers
(74) *Attorney, Agent, or Firm* — Troutman Pepper Locke LLP

(57) ABSTRACT

Methods, non-transitory computer readable media, network traffic manager apparatuses, and systems that assist with establishing a connection to a server with a certificate includes receiving a request for establishing an encrypted connection and obtaining a certificate responsive to the received request. Next, the network traffic manager apparatus generates a content cache key for the obtained certificate. Next, the network traffic manager apparatus retrieves a data structure in the cache using the generated content cache key for the obtained certificate. The retrieved data structure is generated and stored in the cache during a previous established encrypted connection. The data structure comprises of extracted data from a previous certificate. Then, the network traffic manager apparatus initiates encryptographic operations using the retrieved data structure from the cache.

20 Claims, 6 Drawing Sheets

(56) References Cited

U.S. PATENT DOCUMENTS

| | | | | |
|---|---|---|---|---|
| 9,887,982 | B2 * | 2/2018 | Andrews | H04L 9/3268 |
| 9,893,883 | B1 * | 2/2018 | Chaubey | H04L 63/029 |
| 10,110,592 | B2 * | 10/2018 | Veladanda | H04L 63/0823 |
| 10,116,621 | B2 * | 10/2018 | Bandini | H04L 9/32 |
| 10,230,695 | B2 * | 3/2019 | Cline | H04L 63/0281 |
| 10,951,652 | B1 * | 3/2021 | Sharifi Mehr | H04L 63/0807 |
| 10,958,666 | B1 * | 3/2021 | Witten | H04L 41/0895 |
| 11,528,150 | B1 * | 12/2022 | Stapleton | H04L 9/3242 |
| 11,968,302 | B1 * | 4/2024 | Kumar | H04W 12/73 |
| 2002/0069361 | A1 * | 6/2002 | Watanabe | H04L 9/3231 |
| | | | | 713/185 |
| 2002/0196935 | A1 * | 12/2002 | Wenocur | H04L 63/12 |
| | | | | 380/37 |
| 2003/0041110 | A1 * | 2/2003 | Wenocur | H04L 65/80 |
| | | | | 709/206 |
| 2006/0005026 | A1 * | 1/2006 | Song | H04L 9/3263 |
| | | | | 713/173 |
| 2006/0005237 | A1 * | 1/2006 | Kobata | H04L 63/0823 |
| | | | | 726/12 |
| 2009/0327708 | A1 * | 12/2009 | Hazlewood | H04L 63/0823 |
| | | | | 713/158 |
| 2011/0154018 | A1 * | 6/2011 | Edstrom | H04L 67/566 |
| | | | | 713/151 |
| 2011/0231923 | A1 * | 9/2011 | Bollay | H04L 63/0442 |
| | | | | 726/9 |
| 2015/0100780 | A1 * | 4/2015 | Rubin | H04L 63/0823 |
| | | | | 713/157 |
| 2016/0269369 | A1 * | 9/2016 | Thomson | H04L 63/06 |
| 2017/0142100 | A1 * | 5/2017 | Bollay | H04L 63/0245 |
| 2017/0230355 | A1 * | 8/2017 | Su | H04L 63/0435 |
| 2019/0044929 | A1 * | 2/2019 | Kashyap | H04L 9/3231 |
| 2019/0245700 | A1 * | 8/2019 | Dobre | H04L 67/1097 |
| 2022/0210147 | A1 * | 6/2022 | Galvin | H04L 63/0823 |

OTHER PUBLICATIONS

Van den Abeele et al.; "Secure Service Proxy: A CoAP(s) Intermediary for a Securer and SmarterWeb of Things", 2017, mdpi.com/journal/sensors, pp. 1-30. (Year: 2017).*
International Search Report and Written Opinion Dated Mar. 18, 2024. PCT Application No. PCT/US2023/080010.
International Preliminary Report on Patentability for PCT/US2023/080010, dated Jun. 24, 2025.

* cited by examiner

Receive a previous certificate for establishing an encrypted connection

305

Generate a previous content cache key using the previous certificate

310

Store the data structure in the cache using the previous content cache key

315

Initiate encryptographic operations using the data structure

320

END

325

METHODS FOR ESTABLISHING A CONNECTION TO A SERVER WITH A CACHED CERTIFICATE AND DEVICES THEREOF

FIELD

This technology relates to methods and systems for establishing a connection to a server with a cached certificate and caching a certificate for future connections.

BACKGROUND

In order to establish a connection, a server may ask a client device to prove its identity, or vice versa. To prove its identity, a server or a client may provide a certificate to authenticate its identity. A client certificate authenticates the client device for the server. A server certificate authenticates the server device for a client device. A server or client certificate is generated each time a connection is established. The problem with generating a certificate each time a connection is established is that this means the system endures a lot of duplicated verification efforts.

SUMMARY

A method for establishing a connection to a server with a certificate, implemented in cooperation with a cloud service or a network traffic management system comprising one or more network traffic management modules, server modules, or client modules, includes receiving a request for establishing an encrypted connection and obtaining a certificate responsive to the received request. Next, generating a content cache key for the obtained certificate and retrieving a data structure in the cache using the generated content cache key for the obtained certificate. The retrieved data structure is generated and stored in the cache during a previous established encrypted connection. The data structure comprises of extracted data from a previous certificate. Lastly, the encryptographic operations are initiated using the retrieved data structure from the cache.

A network traffic management apparatus including memory including programmed instructions stored thereon and one or more processors configured to be capable of executing the stored programmed instructions to receive a request for establishing an encrypted connection and obtaining a certificate responsive to the received request. Next, the network traffic manager apparatus generates a content cache key for the obtained certificate. Next, the network traffic manager apparatus retrieves a data structure in the cache using the generated content cache key for the obtained certificate. The retrieved data structure is generated and stored in the cache during a previous established encrypted connection. The data structure comprises of extracted data from a previous certificate. Then, the network traffic manager apparatus initiates encryptographic operations using the retrieved data structure from the cache.

A non-transitory computer readable medium having stored thereon instructions for including executable code that, when executed by one or more processors, causes the processors to receive a request for establishing an encrypted connection and obtaining a certificate responsive to the received request. Next, the network traffic manager apparatus generates a content cache key for the obtained certificate. Next, the network traffic manager apparatus retrieves a data structure in the cache using the generated content cache key for the obtained certificate. The retrieved data structure is generated and stored in the cache during a previous established encrypted connection. The data structure comprises of extracted data from a previous certificate. Then, the network traffic manager apparatus initiates encryptographic operations using the retrieved data structure from the cache.

A network traffic management system includes one or more traffic management modules, server modules, or client modules, memory comprising programmed instructions stored thereon, and one or more processors configured to be capable of executing the stored programmed instructions to receive a request for establishing an encrypted connection and obtaining a certificate responsive to the received request. Next, the network traffic manager apparatus generates a content cache key for the obtained certificate. Next, the network traffic manager apparatus retrieves a data structure in the cache using the generated content cache key for the obtained certificate. The retrieved data structure is generated and stored in the cache during a previous established encrypted connection. The data structure comprises of extracted data from a previous certificate. Then, the network traffic manager apparatus initiates encryptographic operations using the retrieved data structure from the cache.

This technology provides a number of advantages including providing methods, non-transitory computer readable media, network traffic management apparatuses, and network traffic management systems that help to store certificates for future connections in order to prevent duplicative efforts to generate new certificates for each needed connection. This technology creates a method of establishing a connection with a cached certificate that can be used to increase efficiency.

DETAILED DESCRIPTION

Figure 1:
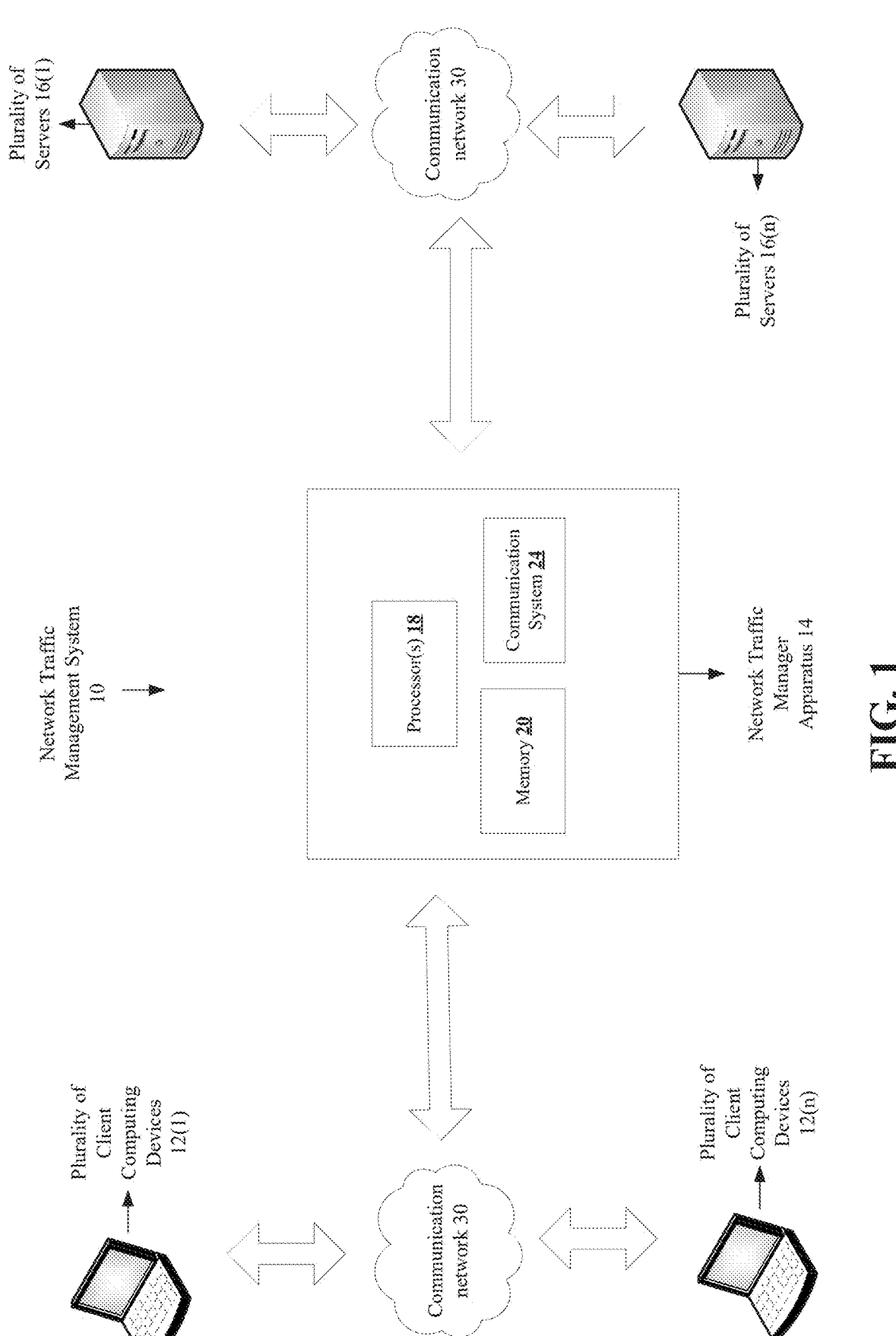
FIG. 1 is block diagrams of an exemplary network traffic management system with a network traffic management apparatus.
Figure 2:
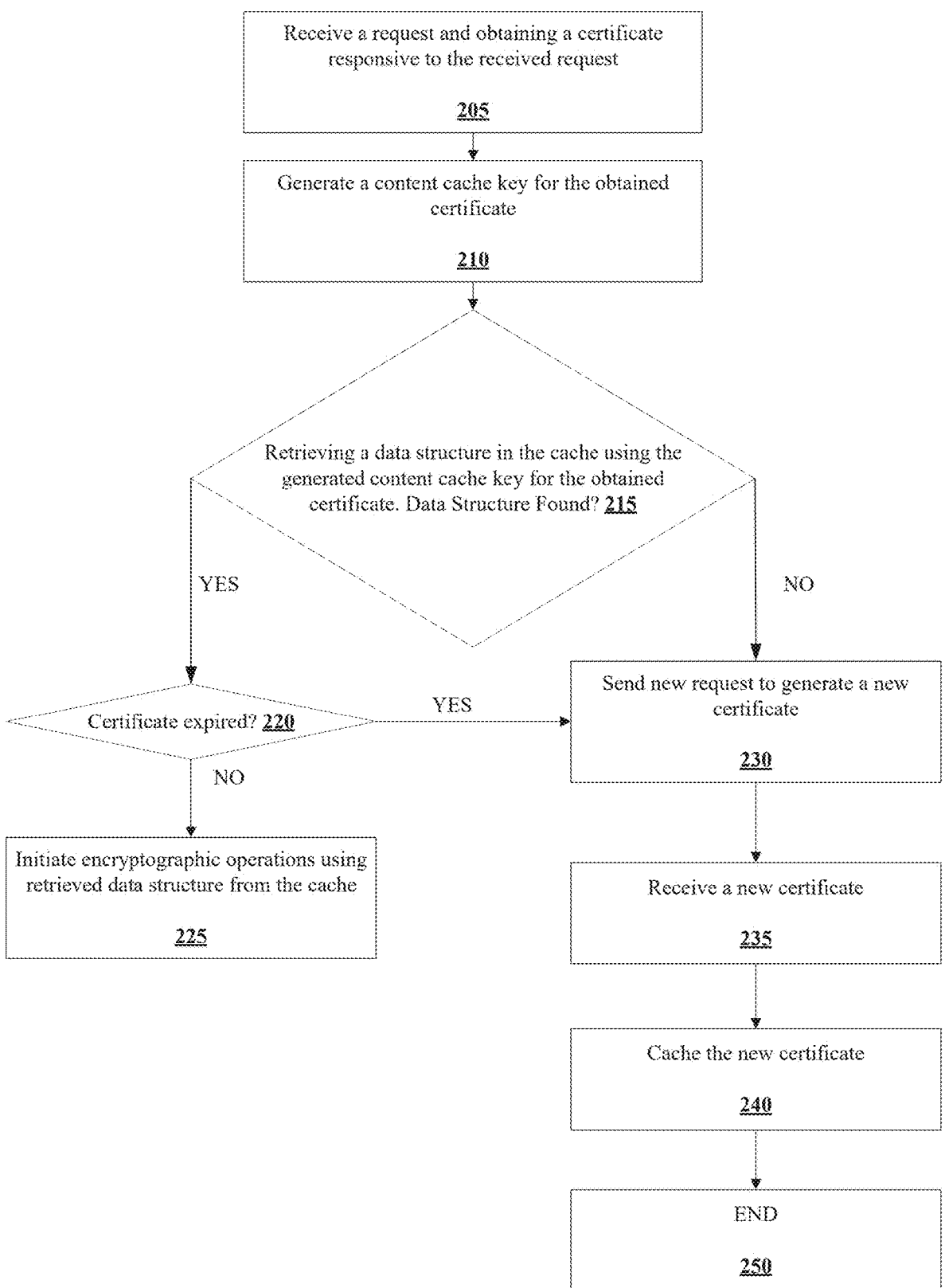
FIG. 2 is a flowchart of an exemplary method for retrieving a cached certificate that was cached for future connections.

An example of a network environment 10 which incorporates a network traffic management system for caching a certificate with the network traffic manager apparatus 14 is illustrated in FIGS. 1 and 2. The exemplary environment includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. This technology provides a number of advantages including preventing network attacks.

Referring more specifically to FIG. 1, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the plurality of servers 16(1)-16(n) and the network traffic manager apparatus 14 may be coupled together via other topologies. While not shown, the exemplary environment may include additional network components, such as routers, switches and other devices, which are well known to those of ordinary skill in the art and thus will not be described here. The communication network 30 can be a wide area network (WAN) or a local area network (LAN). Other network devices configured to generate, send, and receive network communications can be used.

In one such embodiment, at least one network traffic management apparatus 14 is disposed on a client side of a WAN as associated with a LAN connecting many client computing devices 12(1)-12(n). Although network traffic management apparatus 14 is shown in this example, the environment may be coupled in other configurations.

The network traffic manager apparatus 14 assists with caching certificates as illustrated and described by way of the examples herein, although the network traffic manager apparatus 14 may perform other types and/or numbers of functions. As an example, the network traffic manager apparatus 14 may perform optimizing, securing, and accelerating the network traffic between the client computing devices 12(1)-12(n) and the plurality of servers 16(1)-16(n). As illustrated in FIG. 1, the network traffic manager apparatus 14 includes at least one processor or central processing unit (CPU) 18, memory 20, and a communication system 24 which are coupled together by a bus device although the network traffic manager apparatus 14 may comprise other types and numbers of elements in other configurations. In this example, the bus is a PCI Express bus in this example, although other bus types and links may be used.

Each of the client computing devices 12(1)-12(n) and each of the plurality of servers 16(1)-16(n) include a central processing unit (CPU) or processor 18, a memory 22, an interface device, and an I/O system, which are coupled together by a bus or other link, although other numbers and types of network devices could be used. The client computing devices 12(1)-12(n) may run interface applications, such as Web browsers, that may provide an interface to make requests for and send content and/or data to applications or services provided by the server computing devices 20(1)-20(n) via the communication network 30, LANs and/or WAN using the network traffic manager apparatus 14.

In some embodiments, the network traffic manager apparatus 14 can be a proxy that sits between the plurality of servers 16(1)-16(n) and the plurality of client computing devices 12(1)-12(n). In one embodiment, the proxy may be a third-party interposed between one of the plurality of client computing devices 12(1)-12(n) and one of the plurality of servers 16(1)-16(n) (or network traffic manager apparatus 14). Generally, the plurality of servers 16(1)-16(n) process requests received from the network traffic manager apparatus 14, that is sent to the network traffic manager apparatus 14 from the client computing devices 12(1)-12(n) via the communication network 30 such as the LANs and/or WAN according to the HTTP-based application RFC protocol or the CIFS or NFS protocol for example. Various network processing applications, such as CIFS applications, NFS applications, HTTP Web Server computing device applications, and/or FTP applications, may be operating on the plurality of servers 16(1)-16(n) and transmitting data (e.g., files, Web pages) to the network traffic manager apparatus 14 in response to requests from the network traffic manager apparatus 14.

The processors 18 within the network traffic manager apparatus 14 may execute one or more computer-executable instructions stored in memory 20 for the methods illustrated and described with reference to the examples herein, although the processor 18 can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
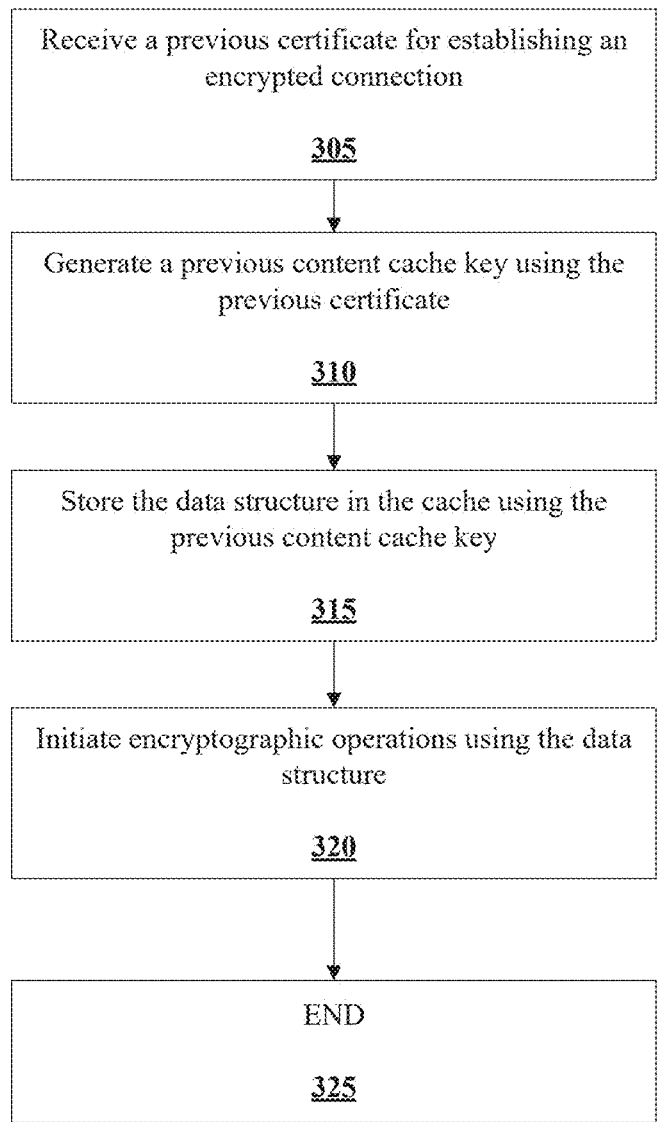
FIG. 3 is a flowchart of an exemplary method for caching a certificate for future connections.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIGS. 2 and 3 is representative of example steps or actions of this technology that may be embodied or expressed as one or more non-transitory computer or machine readable instructions stored in the memory 20 that may be executed by the processor 18.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 2 and 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The communication system in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks 30 or systems with other types and numbers of connections and configurations to other devices and elements may be used. By way of example only, the communication network 30 such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus is a PCI Express bus in this example, although other bus types and links may be used. The LANs in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of traffic network topology may be used.

Each of the plurality of client computing devices 12(1)-12(n) of the network traffic management system 10, include a central processing unit (CPU) or processor 18, a memory, input/display device interface, and an input/output system or I/O system, which are coupled together by a bus or other link. The plurality of client computing devices 12(1)-12(n), in this example, may run interface applications that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the plurality of servers 16(1)-16(n).

Each of the plurality of servers 16(1)-16(n) of the network traffic management system include a central processing unit (CPU) or processor 18, a memory, and a communication system 24, which are coupled together by a bus or other link, although other numbers and/or types of network devices could be used. Generally, the plurality of servers 16(1)-16(n) may include any computing device capable of communicating packets to another network device. Each packet may convey a piece of information. A packet may be sent for handshaking, e.g., to establish a connection or to acknowledge receipt of data. The packet may include information such as a request, a response, or the like. Generally, packets received by the plurality of servers 16(1)-16(n) may be formatted according to TCP/IP, but they could also be formatted using another protocol, such as SCTP, X.25, NetBEUI, IPX/SPX, token ring, similar IPv4/6 protocols, and the like. Moreover, the packets may be communicated between the plurality of servers 16(1)-16(n), the plurality of client computing devices 12(1)-12(n), and the network traffic management system 10 employing HTTP, HTTPS, and the like. It is to be understood that the plurality of servers 16(1)-16(n) may be hardware or software or may represent a system with multiple external resource servers, which may include internal or external networks. In one embodiment, the plurality of servers 16(1)-16(n) are configured to operate as a website server. However, the plurality of servers 16(1)-

16(n) are not limited to web server devices, and may also operate a messaging server, a File Transfer Protocol (FTP) server, a database server, content server, and the like. Additionally, each of the plurality of servers 16(1)-16(n) may be configured to perform a different operation. Thus, for example, server 16(1) may be configured as a messaging server, while server 16(n) is configured as a database server. Moreover, while the plurality of servers 16(1)-16(n) may operate as other than a website, they may still be enabled to receive an HTTP communication. Devices that may operate as plurality of servers 16(1)-16(n) include personal computers, desktop computers, multiprocessor systems, microprocessor-based or programmable consumer electronics, network PCs, server devices, and the like.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture. The plurality of servers 16(1)-16(n) can include a processing unit, video display adapters, and a mass memory, all in communication with each other via a bus. The mass memory generally includes RAM, ROM, and one or more permanent mass storage devices, such as hard disk drive, tape drive, CD-ROM/DVD-ROM drive, and/or floppy disk drive. The mass memory can store an operating system for controlling the operation of the plurality of servers 16(1)-16(n). Any general-purpose operating system may be employed. Basic input/output system ("BIOS") can be also provided for controlling the low-level operation of the plurality of servers 16(1)-16(n). The plurality of servers 16(1)-16(n) also can communicate with the Internet, or some other communications network, via network interface unit 310, which is constructed for use with various communication protocols including the TCP/IP protocol.

Figure 4:
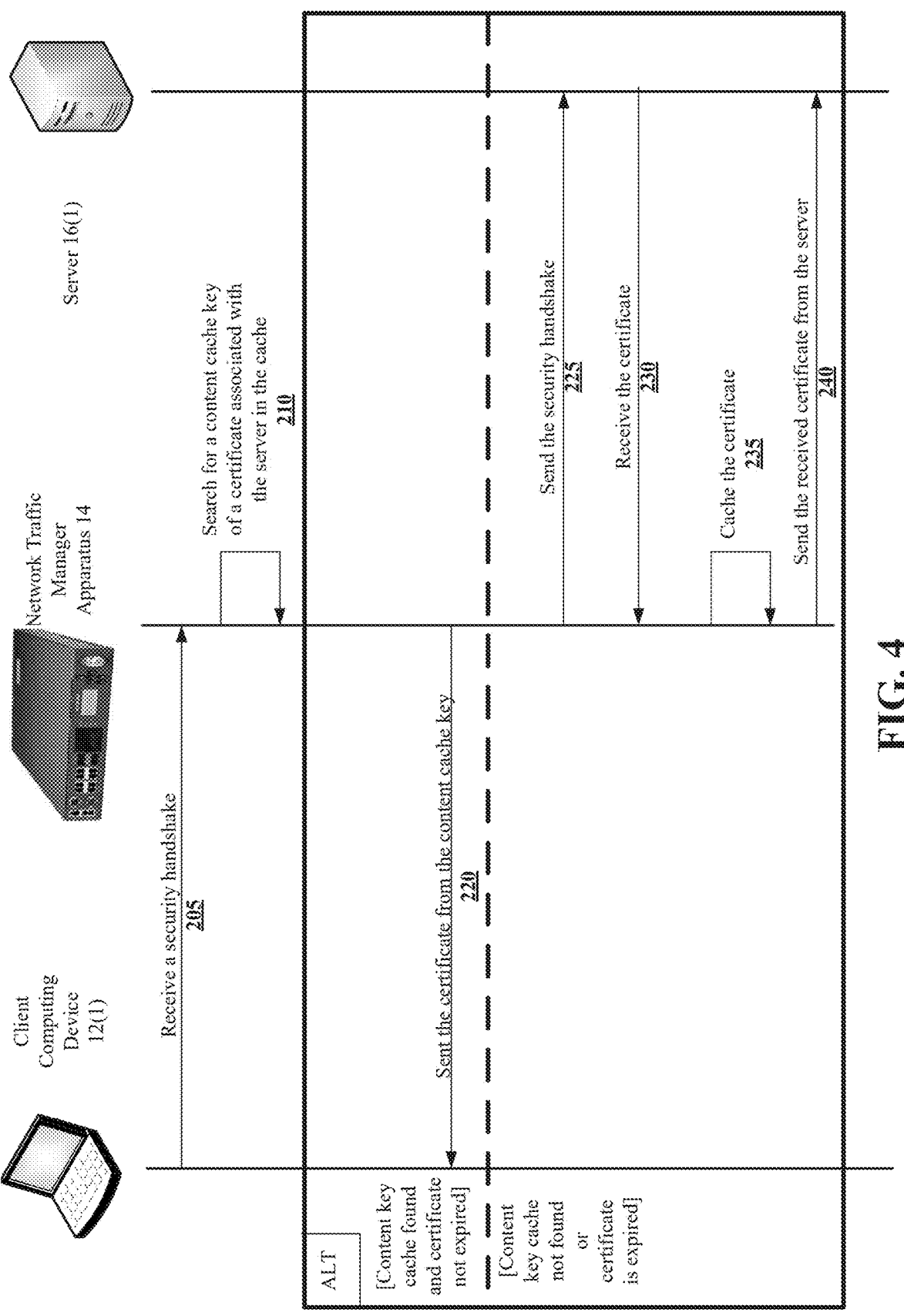
FIG. 4 is an exemplary sequence flow diagram illustrating the method for retrieving a cached certificate that was cached for future connections.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14. Additionally, as illustrated in FIG. 4, one of the plurality of servers (16)(1)-16(n) can be used to implement the technology disclosed herein.

While the network traffic manager apparatus 14 is illustrated in this example as including a single device, the network traffic manager apparatus 14 in other examples can include a plurality of devices or blades each with one or more processors 18 each processor 18 with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of servers 16(1)-16(n) or, the network traffic manager apparatus 14, or applications coupled to the communication network(s) 30, for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30, LANS, WAN, are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for establishing a connection to a server 16(1) with a certificate will now be described with reference to FIGS. 2 and 4. First in step 205, the network traffic manager apparatus 14 receives a request for establishing an encrypted connection and obtaining a certificate responsive to the received request. In other embodiments, the request can be sent by a server and the certificate can be a server certificate. In some embodiments, prior to the request there can be a security handshake from a client computing device 12(1) also known as a client 12(1). The security handshake in some embodiments can be received for establishing a connection to a server. In some embodiments, the security handshake can be a Secure Socket Layer (SSL) handshake for establishing a current SSL connection to a server. The SSL protocol is described in Netscape Communications Corp, Secure Sockets Layer version 3 (November 1996), and the TLS protocol is derived from SSL, and is described in Dierks, T., and Allen, C., "The TLS Protocol Version 1.0," RFC 2246 (January 1999), available from the IETF. The DTLS protocol is based on the TLS protocol, and is described in Rescorla, E., and Modadugu, N., "Datagram Transport Layer Security," RFC 4347 (April 2006), available from the IETF. Each of these documents is incorporated herein by reference in their entirety. An SSL connection is a connection that is secured by cryptographic information derived from an SSL protocol. The SSL protocol operates between an application layer (such as one or more of OSI layers 5-7) and a transport layer (such as OSI layer 4). The SSL protocol may provide security for application layer protocols such as HyperText Transfer Protocol (HTTP), Lightweight Directory Access Protocol (LDAP), Internet Messaging Access Protocol (IMAP), or the like. For example, HTTP over SSL (HTTPS) utilizes the SSL protocol to secure HTTP data. The SSL protocol may utilize Transport Control Protocol/Internet Protocol (TCP/IP) on behalf of the application layer protocols to transport secure data.

In some embodiments, the SSL connection may be established between the plurality of client computing devices 12(1)-12(n) and the network traffic manager apparatus 14 that operates on behalf of a plurality of servers 16(1)-16(n). In some embodiments, the network traffic manager apparatus 14 can be a proxy that sits between the plurality of servers 16(1)-16(n) and the plurality of client computing devices 12(1)-12(n). In one embodiment, the proxy may be a third-party interposed between one of the plurality of client computing devices 12(1)-12(n) and one of the plurality of servers 16(1)-16(n) (or network traffic manager apparatus 14). SSL handshake messages are sent between the client computing device 12(1) and the network traffic manager apparatus 14, then from the network traffic manager apparatus 14 to the server 16(1) to establish the SSL connection. As the SSL handshake messages are forwarded through the proxy, the proxy may extract data from at least one of the SSL handshake messages. In addition, the client computing device 12(1) or the server 16(1) (or network traffic manager apparatus 14) may send another message directly for use by the proxy. In one embodiment, the other message may be a certificate. Because the proxy can sit between the plurality of servers 16(1)-16(n) and the plurality of client computing devices 12(1)-12(n), the proxy can encounter the same certificate multiple times. In some embodiments, caching a certificate for future connections can help with efficiency and save the client computing device 12(1) time.

In step 210, the network traffic manager apparatus 14 generates a content cache key for the obtained certificate. A cache key can be a unique identifier for an object in the cache. Data can be stored in the cache so that they can be referenced in the future. A cache key creates a unique way to locate or fetch a key in the cache. A content cache key in this example, can be created so that there is a unique reference to the certificate received from the previous security handshake, now stored in the cache. By having a certificate stored in the cache, when a security handshake is received from the client 12(1) in the future to connect to the same server, instead of sending the security handshake to the server 16(1) to establish an SSL connect, the cached certificate can be retrieved and sent to the server 16(1) to expedite and establish a connection to the server.

In step 215, the network traffic manager apparatus 14 retrieves a data structure in the cache using the generated content cache key for the obtained certificate. The received data structure can be generated and stored in the cache during a previous established encrypted connection. The data structure can comprise of extracted data from the previous certificate. Accordingly, if the network traffic manager apparatus 14 does not find the data structure in the cache, then the No branch is taken to step 230. If the network traffic manager apparatus 14 does find the data structure in the cache, then the Yes branch is taken to step 220. In some embodiments, the certificate can have been previously received from the server 16(1) during a previous security handshake protocol. FIG. 3 illustrates an embodiment where the network traffic manager apparatus 14 receives the previous request and caches the certificate for future connection requests.

In step 220, if the content cache key is found in the cache of the certificate associated with the server, the network traffic manager apparatus 14 determines if the certificate is expired. If the network traffic manager apparatus 14 determines the certificate is expired, then the Yes branch is taken to step 230. If the network traffic manager apparatus 14 determines the certificate is not expired, then the No branch is taken to step 225. By example, the certificate can comprise of an expiration time associated with the certificate or session. In some embodiments, the expiration time and date can be assigned to the cache. In one embodiment, the expiration time and date may be the time and date the certificate was created plus a time-to-live time. Accordingly, if the expiration time and date is sooner than the current time and date, the expiration time has passed, and the certificate has expired. If the expiration time or date is later than the current time and date, then the expiration time has not passed, and the certificate is not expired. In an alternate embodiment, the creation time and date may be stored in the certificate stored in the cache.

In step 225, if the certificate is not expired, the network traffic manager apparatus 14 initiates encryptographic operations using the retrieved data structure from the cache. In some embodiments, the network traffic manager apparatus 14 sends the certificate to the server 16(1) from the content cache key in the cache. By example, instead of requesting new certificates for different sessions and instances for security handshakes received from a client 12(1), the network traffic manager apparatus 14 can be efficient by sending the certificate stored in the content cache key in the cache instead of re-sending the security handshake to the server 16(1) to retrieve a new certificate, which can take longer. A certificate allows for a server 16(1) of the plurality of servers 16(1)-16(n) and a client computing device 12(1) of the plurality of client computing devices 12(1)-12(n) to establish that the appropriate server 16(1) and client computing device 12(1) is sending and receiving the data, and in order to establish proper verification, both endpoints must have the right identity. By storing the certificate and reusing the certificate from a previous security handshake to the same server 16(1) before requesting a new certificate, the network traffic manager apparatus 14 can efficiently verify its identify to the server 16(1) without duplicative efforts. Caching the contents of the server 16(1) certification verification for subsequent SSL handshakes to the same server 16(1) allow for an optimized approach for SSL handshakes.

In step 230, if the network traffic manager apparatus 14 determines the certificate is expired in step 220 or if in step 215 the network traffic manager apparatus 14 does not find the data structure in the cache, then the network traffic manager apparatus 14 sends a new request to generate a new certificate. The new certificate can be a server certificate or a client certificate. In some embodiments, an SSL handshake protocol includes the exchange and processing of a series of messages, which may be one of an alert, handshake, and/or change_cipher_spec content type. One or more SSL handshake messages are encapsulated within one or more network records of the handshake content type. The SSL handshake message also includes an associated SSL handshake type, and one or more data fields.

In step 235, the network traffic manager apparatus 14 receives a new certificate. In some embodiments, the new certificate can be a server certificate or a client certificate. In some embodiments, the new certificate is received from the server 16(1) after sending the received security handshake from the client computing device 12(1) to the server 16(1). The SSL protocol may also employ a certificate. In one embodiment, a certificate is an X.509 certificate, such as those described in RFC 2459, available from the IETF, which is also incorporated herein by reference. An SSL session refers to a secure session between two endpoints, wherein the session is secured using the SSL protocol. Although an SSL session is generally described herein as being established between a plurality of client computing devices 12(1)-12(n) and plurality of servers 16(1)-16(n) over a communication network 30, it should be understood that an SSL session may be established between virtually any types of network devices enabled to employ the SSL protocol. The SSL protocol uses a series of SSL handshakes (i.e. an SSL handshake protocol) to initiate an SSL session. An SSL session is associated with a master secret (also known as a session key) that results from the SSL handshakes. An SSL session is further associated with additional secret data that enables the SSL session (e.g. pre-master secret, random data, server's public and private keys and/or client's public and private keys). The SSL protocol also includes an SSL re-handshake procedure for renegotiating an SSL session. The renegotiated SSL session may be associated with the current. SSL session or with another SSL session. An SSL session may employ one or more underlying network connections. The new certificate can be a certificate from a renegotiated SSL session or a certificate from a new SSL session.

In step 240, the network traffic manager apparatus 14 caches the new certificate. By example, the cache can, in some examples, include one or more memory devices capable of storing data and allowing any storage location to be directly accessed by the network traffic manager apparatus 14. Further examples include a network traffic manager apparatus 14 that can access the cache via one of either: system bus; memory port; or any other connection, bus or port that allows the network traffic manager apparatus 14 to access the cache or memory. In some embodiments, a data structure can be used to keep track of the certificates in the cache. The data structure could be stored within a NTFS stream with an appropriate name or could be stored as a completely separate file. The certificate can be stored as a content cache key using a data structure as outlined above.

In some embodiments, the network traffic manager apparatus 14 sends the new certificate to the server 16(1) to establish the current SSL connection and the exemplary process ends at step 240. Once the client computing device 12(1) or the network traffic manager apparatus 14 has a valid and unexpired certificate, the certificate can later be presented to the server 16(1) for authentication in order to validate a communication or message from the client computing device 12(1) or the network traffic manager apparatus 14 on behalf of the client computing device 12(1). In some embodiments, after sending the certificate to the server, the network traffic manager apparatus 14 can receive a message from the server 16(1) indicating that the handshake is complete. The network traffic manager apparatus 14 can then receive additional messages from the client computing device 12(1) and send the received additional messages to the server 16(1). The network traffic manager apparatus 14 can also receive additional messages from the server 16(1) and send the received additional messages to the client computing device 12(1).

Figure 5A:
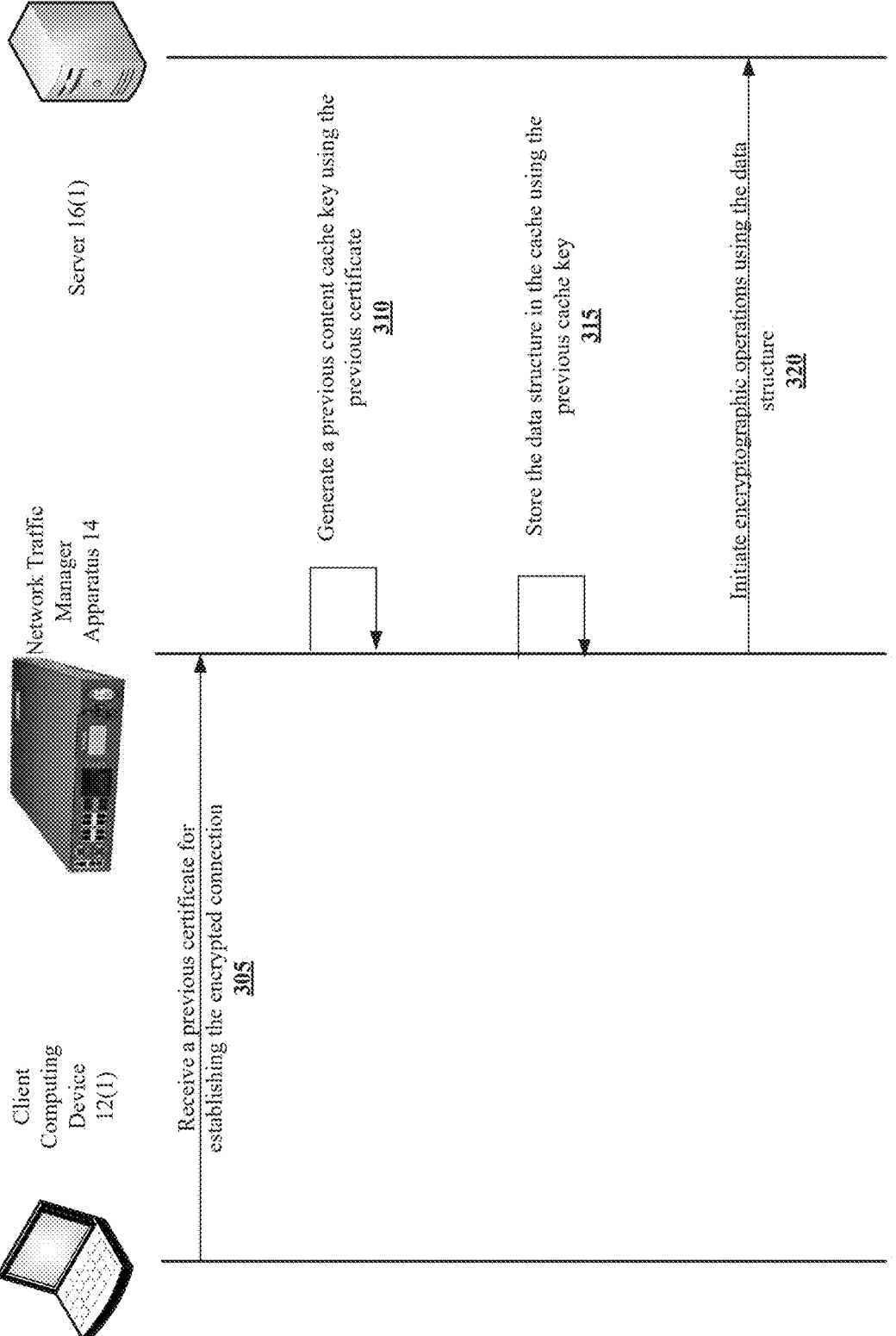
FIG. 5A is an exemplary sequence flow diagram illustrating the method for caching a certificate from a client computing device for future connections.
Figure 5B:
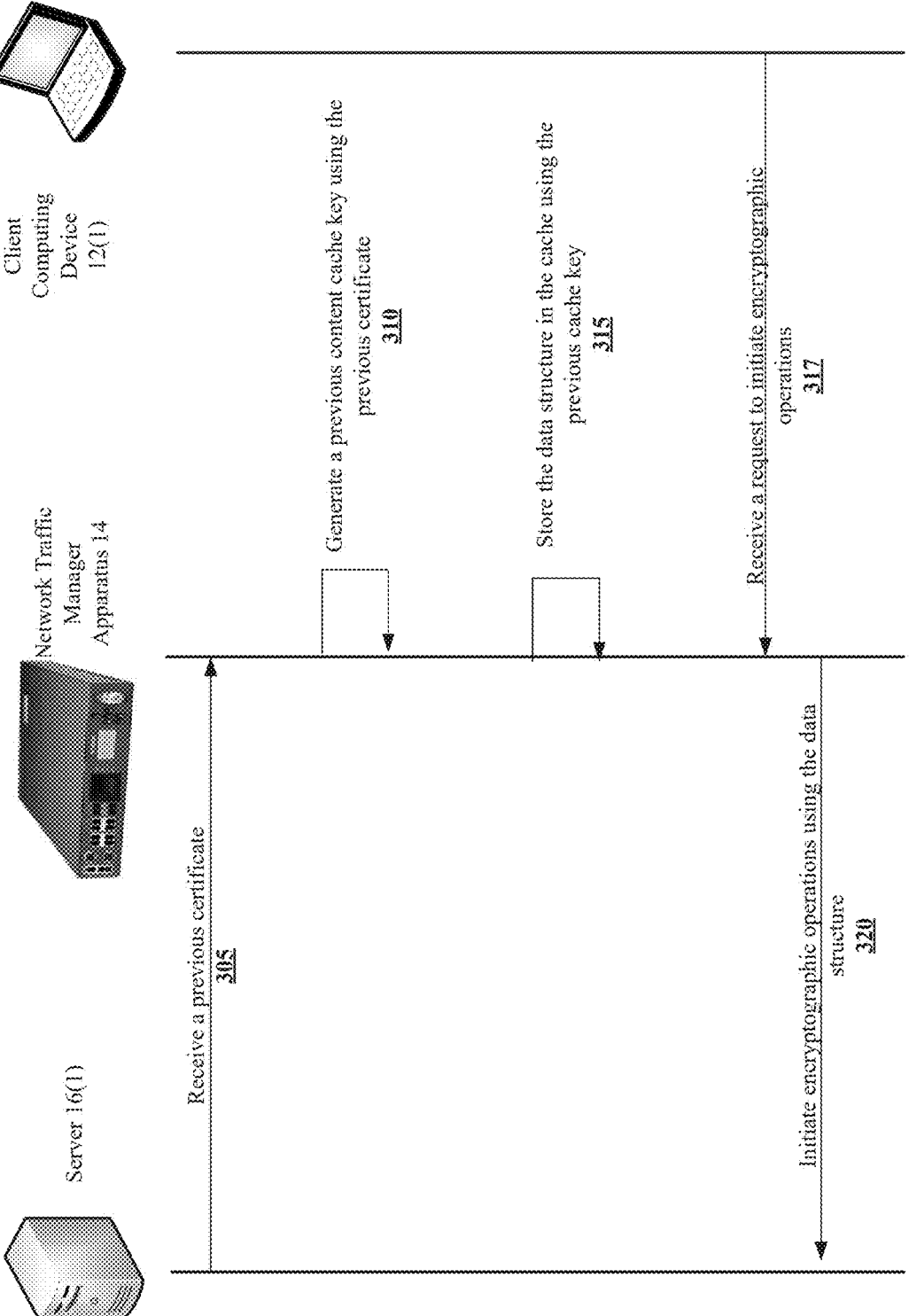
FIG. 5B is an exemplary sequence flow diagram illustrating the method for caching a certificate from a server for future connections.

By example, the method for establishing an initial or previous connection to a server 16(1) will now be described with reference to FIGS. 3, 5A, and 5B. First in step 305, the network traffic manager apparatus 14 can receive a previous certificate for establishing an encrypted connection. In some embodiments, an initial security handshake or a previous security handshake from a client computing device 12(1) to connect to a server 16(1) can be received. In this embodiment, because this is the initial security handshake or a previous security handshake to the server, the network traffic manager apparatus 14 can begin a previous SSL connection protocol by sending the previous security handshake from the client 12(1) to the server 16(1) instead of searching the cache for a cache content key of a certificate. In this embodiment, the network traffic manager apparatus 14 does not need to search the cache for the cache content key of the certificate because the network traffic manager apparatus 14 has not previously established a connection between the client computing device 12(1) and the server 16(1). As depicted in FIG. 5A and FIG. 5B, the certificate can be received by either the client computing device 12(1) or the server 16(1). The certificate can be a client certificate or a server certificate. In some embodiments, the network traffic manager apparatus 14 sends the previous security handshake from the client 12(1) to the server 16(1) to initiate the previous SSL connection to the server. The server 16(1) can respond with a server 16(1) hello message that contains a server's certificate, a message, or a certificate to verify the identify of the client computing device 12(1) or the network traffic manager apparatus 14. The network traffic manager apparatus 14 can use the server's certificate to verify the identify of the server.

In step 310, the network traffic manager apparatus 14 generates a previous cache key using the previous certificate. As outlined above, caching the certificate for future connections can help with efficiency and save the client computing device 12(1) time.

In step 315, the network traffic manager apparatus 14 stores the data structure in the cache using the previous cache key for future connections between the client 12(1) and the server. In some embodiments, before storing the data structure in the cache, the network traffic manager apparatus 14 can analyze the certificate received from the server. Analyzing the certificate can include extracting the expiration date of the certificate as outlined above. Analyzing the certificate can also include a validation process. Validating the certificate can include contacting other servers to check the revocation of the certificate and also to check the information not directly present in the certificate to see if it is accurate. The results from the validation process can also be stored or cached in memory in the data structure. In some embodiments, in step 317, the network traffic manager apparatus 14 can receive a request to initiate encryptographic operations from a client computing device 12(1).

In step 320, the network traffic manager apparatus 14 initiates encryptographic operations using the data structure. In some embodiments, the network traffic manager apparatus 14 can send the received certificate so that the server 16(1) can verify if the certificate corresponds to the client session. This method of establishing an initial connection to a server 16(1) allows the network traffic manager apparatus 14 to establish a current connection, and to cache the certificate for future SSL connections to the server 16(1).

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for establishing a connection to a server with a certificate, the method implemented by a network traffic management system comprising one or more network traffic apparatuses, client devices, or server devices, the method comprising:

receiving a request for establishing an encrypted connection and obtaining a certificate responsive to the received request;

generating a content cache key for the obtained certificate;

retrieving, from the cache, a data structure comprising extracted data from a previous certificate using the generated content cache key for the obtained certificate, wherein the retrieved data structure is generated by:

validating the previous certificate by contacting an associated server to confirm accuracy of the extracted data; and storing the previous certificate and the data structure comprising the verified extracted data in the cache during a previous established encrypted connection; and initiating encryptographic operations using the retrieved data structure from the cache.

2. The method as set forth in claim 1, further comprising:

receiving the previous certificate for establishing the encrypted connection;

generating a previous content cache key using the previous certificate;

caching the data structure in the cache using the previous content cache key, wherein the data structure is generated using extracted data from the previous certificate and a revocation status; and initiating encryptographic operations using the data structure.

3. The method as set forth in claim 2, wherein the certificate or the previous certificate is received by a client and the certificate or the previous certificate is a client certificate.

4. The method as set forth in claim 2, wherein the certificate or the previous certificate is received by a server and the certificate or the previous certificate is a server certificate.

5. The method as set forth in claim 2, wherein the data structure includes an expiration date extracted from the previous certificate, and wherein the stored data structure is updated using data extracted from the certificate when the expiration date is after a current date.

6. A non-transitory computer readable medium having stored thereon instructions for establishing a connection to a server with a certificate comprising executable code which when executed by one or more processors, causes the processors to:

receive a request for establishing an encrypted connection and obtaining a certificate responsive to the received request;

generate a content cache key for the obtained certificate;

retrieve, from the cache, a data structure comprising extracted data from a previous certificate wherein the retrieved data structure is generated by:

validating the previous certificate by contacting an associated server to confirm accuracy of the extracted data; and storing the previous certificate and the data structure comprising the verified extracted data in the cache during a previous established encrypted connection; and initiate encryptographic operations using the retrieved data structure from the cache.

7. The medium as set forth in claim 6, wherein the executable code which when executed by the processors, further causes the processors to:

receive the previous certificate for establishing the encrypted connection;

generate a previous content cache key using the previous certificate;

cache the data structure in the cache using the previous content cache key, wherein the data structure is generated using extracted data from the previous certificate and a revocation status; and initiate encryptographic operations using the data structure.

8. The medium as set forth in claim 6, wherein the certificate or the previous certificate is received by a client and the certificate or the previous certificate is a client certificate.

9. The medium as set forth in claim 6, wherein the certificate or the previous certificate is received by a server and the certificate or the previous certificate is a server certificate.

10. The medium as set forth in claim 9, wherein the data structure includes an expiration date extracted from the previous certificate, and wherein the stored data structure is updated using data extracted from the certificate when the expiration date is after a current date.

11. A network traffic manager apparatus, comprising memory comprising programmed instructions stored in the memory and one or more processors configured to be capable of executing the programmed instructions stored in the memory to:

receive a request for establishing an encrypted connection and obtaining a certificate responsive to the received request;

generate a content cache key for the obtained certificate;

retrieve, from the cache, a data structure comprising extracted data from a previous certificate using the generated content cache key for the obtained certificate, wherein the retrieved data structure is generated by:

validating the previous certificate by contacting an associated server to confirm accuracy of the extracted data; and storing the previous certificate and the data structure comprising the verified extracted data in the cache during a previous established encrypted connection; and initiate encryptographic operations using the retrieved data structure from the cache.

12. The device as set forth in claim 11, wherein the one or more processors are further configured to be capable of executing the programmed instructions stored in the memory to:

receive the previous certificate for establishing the encrypted connection;

generate a previous content cache key using the previous certificate;

cache the data structure in the cache using the previous content cache key, wherein the data structure is generated using extracted data from the previous certificate and a revocation status; and initiate encryptographic operations using the data structure.

13. The device as set forth in claim 11, wherein the certificate or the previous certificate is received by a client and the certificate or the previous certificate is a client certificate.

14. The device as set forth in claim 11, wherein the certificate or the previous certificate is received by a server and the certificate or the previous certificate is a server certificate.

15. The device as set forth in claim 14, wherein the data structure includes an expiration date extracted from the previous certificate, and wherein the stored data structure is updated using data extracted from the certificate when the expiration date is after a current date.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

receive a request for establishing an encrypted connection and obtaining a certificate responsive to the received request;

generate a content cache key for the obtained certificate;

retrieve, from the cache, a data structure comprising extracted data from a previous certificate using the generated content cache key for the obtained certificate, wherein the retrieved data structure is generated by:

validating the previous certificate by contacting an associated server to confirm accuracy of the extracted data; and storing the previous certificate and the data structure comprising the verified extracted data in the cache during a previous established encrypted connection; and initiate encryptographic operations using the retrieved data structure from the cache.

17. The network traffic management system of claim 16, wherein the one or more processors are further configured to be capable of executing the programmed instructions stored in the memory to:

receive the previous certificate for establishing the encrypted connection;

generate a previous content cache key using the previous certificate;

cache the data structure in the cache using the previous content cache key, wherein the data structure is generated using extracted data from the previous certificate and a revocation status; and initiate encryptographic operations using the data structure.

18. The network traffic management system of claim 16, wherein the certificate or the previous certificate is received by a client and the certificate or the previous certificate is a client certificate.

19. The network traffic management system of claim 16, wherein the certificate or the previous certificate is received by a server and the certificate or the previous certificate is a server certificate.

20. The network traffic management system of claim 19, wherein the data structure includes an expiration date extracted from the previous certificate, and wherein the stored data structure is updated using data extracted from the certificate when the expiration date is after a current date.

* * * * *